(No Model.)

A. McLEAN.
CARRYING PULLEY.

No. 416,943. Patented Dec. 10, 1889.

Witnesses,
Geo. H. Strong.

Inventor,
Anthony McLean
By Dewey & Co.
Attys

UNITED STATES PATENT OFFICE.

ANTHONY McLEAN, OF SAN FRANCISCO, CALIFORNIA.

CARRYING-PULLEY.

SPECIFICATION forming part of Letters Patent No. 416,943, dated December 10, 1889.

Application filed June 5, 1889. Serial No. 313,187. (No model.)

*To all whom it may concern:*

Be it known that I, ANTHONY MCLEAN, of the city and county of San Francisco, State of California, have invented an Improvement in Carrying-Pulleys; and I hereby declare the following to be a full, clear, and exact description of the same.

My invention relates to an improved construction for pulleys. It is especially adapted to pulleys which are employed to carry a rope in the tube or channel of a cable railway, and for other similar purposes. The peripheries of these grooved pulleys are rapidly worn by the friction of the traveling rope, and when they are worn through it is necessary to throw away the whole of the pulley and supply its place by new. As a great number of these pulleys are used in cable-railway lines, the loss is considerable.

My invention, which is designed to remedy this difficulty, consists in the casting of the rim of the pulley of chilled or white iron, and the spider or center and hub may be made separately and removable, so as to be placed in a new rim when the old one is worn out.

Figure 1:
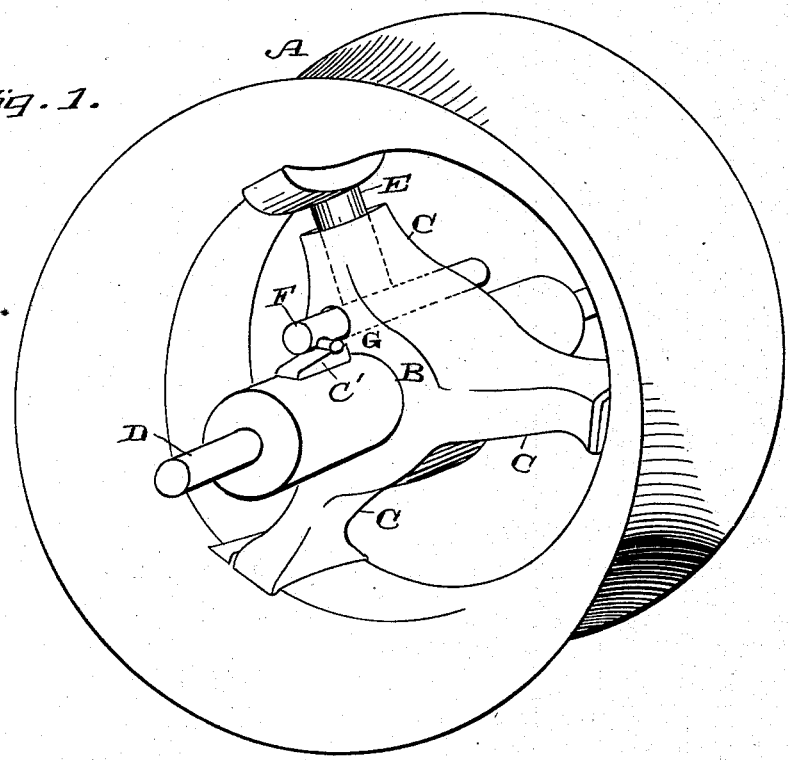
Figure 2:
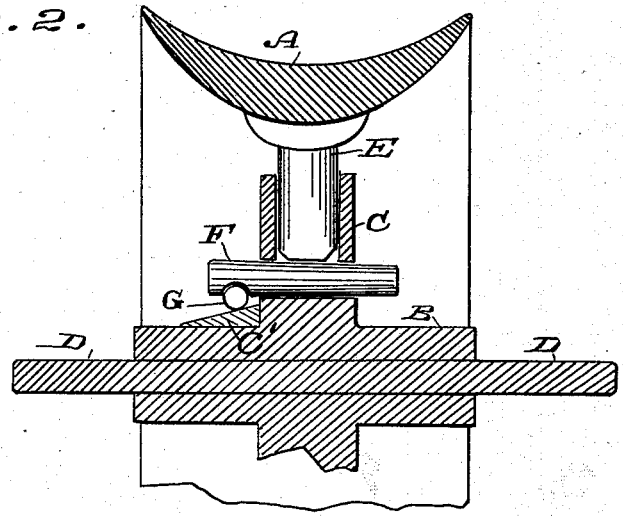

Referring to the accompanying drawings for a more complete explanation of my invention, Figure 1 is a perspective view of my pulley. Fig. 2 is a transverse vertical section.

A is the rim of the pulley, which in the present case is shown as grooved or concave and of sufficient size to support and carry the rope which is to travel over it. This rim is cast of white iron or chilled, so as to be extremely hard. The hub B and the arms C, forming the spider, are cast separately, the hub being bored to receive the steel journal-shaft D, which is fixed therein.

At the ends of two of the arms C are formed the concave enlargements, so shaped as to fit the interior of the rim, which is curved, so that its convexity corresponds with the concavity of the ends of the arms. In the present case I have shown three arms, and the third arm has a hole bored in its end radially from the axis, and a shank E fits into this hole. This shank has a concave end similar to those shown on the other arms C, so as to fit inside of the rim. The hole is deep enough to allow the shank to pass into it far enough to admit of the two arms C being set in their place inside the rim, and the concave end of the shank E is slipped into its place, after which a transverse key F is driven into the hole in the arm C which contains the shank E, this key being tapering and passing beneath the end of the shank E. When this key is driven in, it forces the shank out until its concave end is forced firmly against the inside of the rim, and this forces the similar ends of the other arms C into contact in the same manner, thus holding the spider and hub as firmly within the rim as if they were cast with it.

In order to prevent the key or locking-pin from being shaken or otherwise moved from its place, I have shown the transverse locking-pin G, which engages a notch in the transverse key, and a lug C', which is formed upon the side of the arm C, so that when it is introduced and driven home it will secure the key and prevent its being withdrawn.

The principal wear in these pulleys, as before stated, takes place upon the periphery. It is not possible to cast the whole in white iron or chilled, as the difference of contraction of the rim and the arms or spokes is such that the latter are easily and often broken by unequal strain. By my invention the portion which receives the greatest wear may be made as hard as possible, and the hubs and spokes, being formed separately, may be introduced into the rim and used until the rim is worn out, when they may be removed and used in another rim, thus greatly reducing the expense of these pulleys.

Having thus described my invention, what I claim as new, and desire to secure by Letters Patent, is—

The independent and separate rim and the hub having the radial spokes provided with the enlarged concave ends, one of said spokes being bored radially, and having the supplemental shank fitting the hole and movable radially therein, in combination with the wedge or key fitted transversely through the spoke and behind the end of the supplemental shank, and the locking-pin engaging said key, substantially as described.

In witness whereof I have hereunto set my hand.

ANTHONY McLEAN.

Witnesses:
GEO. H. STRONG,
S. H. NOURSE.